United States Patent [19]
Moreno

[11] Patent Number: 5,082,043
[45] Date of Patent: * Jan. 21, 1992

[54] WINDOW SHADE MECHANISM FOR A MODULAR AIRCRAFT WINDOW

[75] Inventor: Gilbert C. Moreno, San Antonio, Tex.

[73] Assignee: MSA Aircraft Interior Products, Inc., San Antonio, Tex.

[ * ] Notice: The portion of the term of this patent subsequent to Mar. 12, 2008 has been disclaimed.

[21] Appl. No.: 706,214

[22] Filed: May 28, 1991

Related U.S. Application Data

[63] Continuation-in-part of Ser. No. 415,016, Jul. 29, 1991, Pat. No. 4,998,576, and a continuation-in-part of Ser. No. 667,019, Mar. 8, 1991.

[51] Int. Cl.$^5$ ............................................... E06B 3/32
[52] U.S. Cl. ...................................... 160/90; 160/84.1; 160/188
[58] Field of Search ................ 160/90, 84.1, 188, 310, 160/172, 321

[56] References Cited

U.S. PATENT DOCUMENTS

| | | | |
|---|---|---|---|
| 4,679,610 | 7/1987 | Spraggins | 160/84.1 X |
| 4,762,159 | 8/1988 | Ford | 160/84.1 |
| 4,852,627 | 8/1989 | Peterson et al. | 160/84.1 |
| 4,917,167 | 4/1990 | Voss et al. | 160/84.1 |
| 4,998,576 | 3/1991 | Moreno | 160/90 |

*Primary Examiner*—Blair M. Johnson
*Attorney, Agent, or Firm*—Gunn Lee & Miller

[57] ABSTRACT

Device for raising and lowering a modular aircraft window having an interpane, outerpane, frame assembly securing the inner and outer pane, collapsible shade with a fixed and movable end, the device comprising a block and tackle having a movable pulley and more than one fixed pulley, the movable pulley and fixed pulleys connected by a cable fixed at one end and attached at second end to the moving end of the collapsible shade. Moving the movable pulley effects a movement, through the cable, through the moving end of the collapsible shade, and creates a mechanical advantage multiplying the distance moved by the lever.

11 Claims, 1 Drawing Sheet

WINDOW SHADE MECHANISM FOR A MODULAR AIRCRAFT WINDOW

RELATED APPLICATION

This is a continuation-in-part of 07/415,016, filed Jul. 29, 1991, now U.S. Pat. No. 4,998,576 and a continuation-in-part of 07/667,019, filed Mar. 8, 1991, pending.

FIELD OF THE INVENTION

A mechanism for raising and lowering the shade of a modular aircraft window, the mechanism comprising a sliding pulley activated by a lever and cooperating with fixed pulleys and cables to raise and lower the shade.

BACKGROUND OF THE INVENTION

Designers of aircraft interiors desire an attractive window, yet one which is functional. More specifically, aircraft interior designers must design the aircraft windows within the constraints of the specific air frame structure of the aircraft fuselage. Frequently, the shape of the cabin windows is dictated by the spacing of stress carrying aircraft main frame members. Such restraints often require that the vertical axis of the window be greater than the horizontal axis.

When windows contain an enclosed shade, such as that disclosed in U.S. Pat. No. 4,679,610, (the specifications of which are incorporated herein by references as if fully set forth), it is often desirous to have the shade actuator level resting along the upper or lower edge of the frame and moving in a horizontal, or left-right direction.

When windows contain an elongated vertical axis, it is required that the movement of the shade between a full-open and full-closed position be completed through the movement of a horizontally mounted lever over a distance less than the distance between the opened and closed position of the shade. As such, a reversible distance multiplier is required.

SUMMARY OF THE INVENTION

The invention disclosed and claimed herein is designed to allow an aircraft window shade to move vertically between a full-opened and a full-closed position through the movement of a horizontally operated actuator, whose throw is less than the distance between the full-opened and full-closed position of the window shade.

It is the purpose of this invention to provide an actuator for a window shade capable of moving the shade between a full-opened and full-closed position.

It is a further object of this invention to provide for a combination of a moving pulley and fixed pulleys which will allow a window shade to be moved between a full-opened to a full-closed position.

It is the further object of this invention to provide for a horizontal moving sliding pulley in combination with fixed pulleys and cables which drive the window shade between a full-opened and a full-closed position.

This result is accomplished by using a horizontal slidably mounted lever actuator having a pulley attached thereto, which when coupled with fixed pulleys allows the moving end of the shade to move between an open and closed position.

Additional objects of this invention will become apparent upon reference to the specifications and claims as more fully set forth below.

DETAILED DESCRIPTION OF THE PREFERRED EMBODIMENTS

Figure 1:
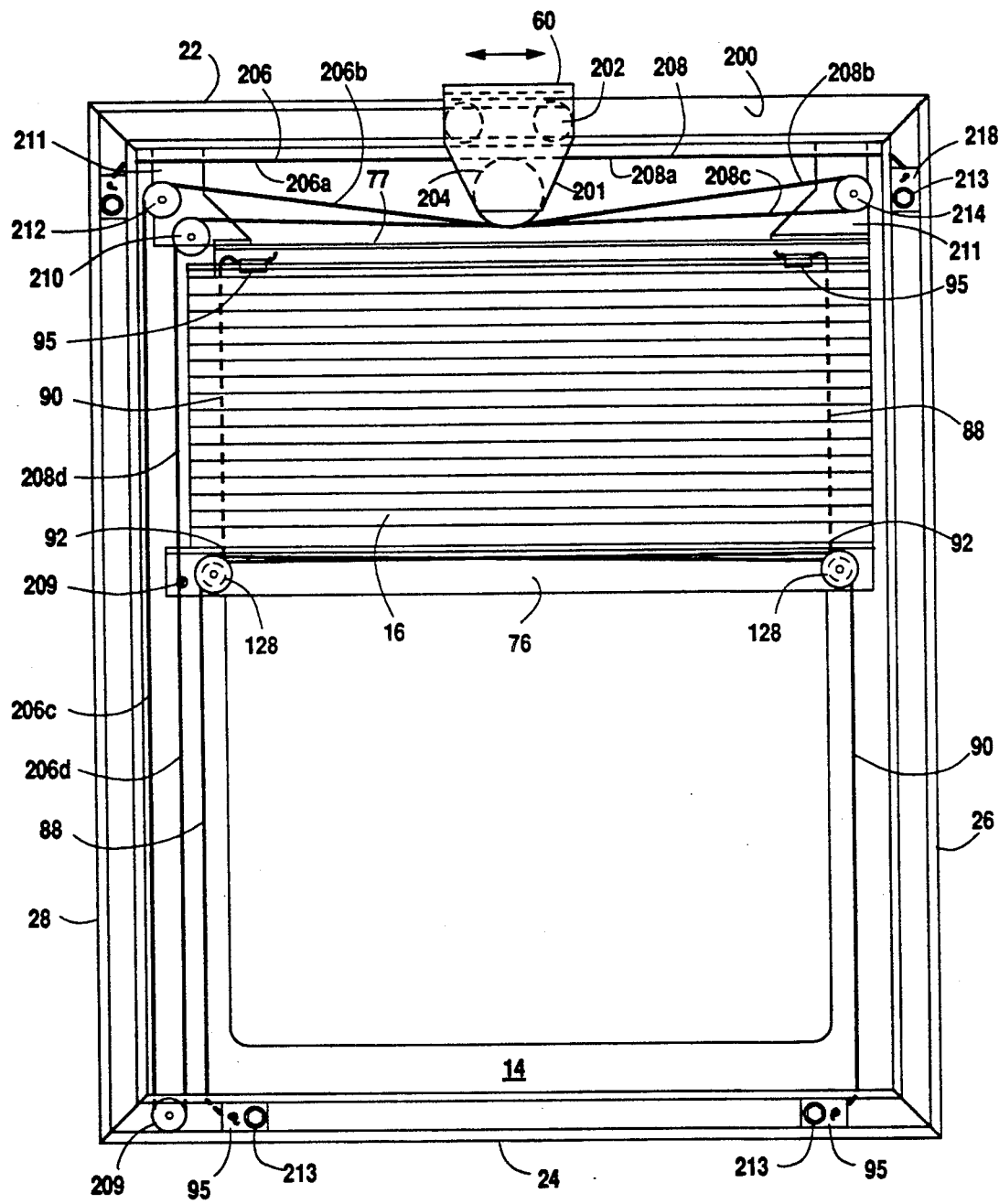
FIG. 1 is an elevational view of the window shade showing the sliding and the fixed pulleys of the present invention.

The window shade mechanism is generally constructed as set forth in U.S. Pat. No. 4,679,610 and U.S. Pat. No. 4,998,576, the specifications of both being incorporated herein by reference.

FIG. 1 illustrates a modular window (10). As can be seen in FIG. 1, window (10) is comprised of a generally rectangular aluminum metal frame comprised of upper frame member (22), lower frame member (24) and side frame members (26) and (28). Shade (16) is mounted to moving shade rail (76) at a first end and attached to fixed shade rail (77) at a second end thereof.

As can be further seen in FIG. 1, applicant's invention comprises a lever actuator (60) for sliding in track (200) of upper frame member (22). Lever actuator (60) is comprised of a backing plate (201) the inner surface on which are mounted track guides (202), such as wheels, bushings or the like. Set up as illustrated in FIG. 1, two track guides (202) supply a broad base in which lever actuator (60) can mount and will prevent twisting thereof when force is applied to lever actuator (60). Also fixed to the inner face of backing plate (201) is sliding pulley (204). Sliding pulley (204) along with fixed pulleys (209), (210), (212) and (214) are connected through first cable means (206) and second cable means (208) to form a block and tackle system which allows moving shade rail (76) with shade (16) attached thereto to rise and fall between an open and closed position when lever actuator (60) is moved back and forth parallel to track (200) in upper frame member (22).

Thus, it can be seen, that first cable means (206) is attached at adjustable attachment means (216) and second cable means (208) is attached at adjustable attachment means (218). Preferably, both first cable means (206) and second cable means (208) tie in at (209') at one end of shade rail (76). Both cable means (206) and (208) are attached at a first end to a point, usually on the frame of the window that is stationary with respect to both the sliding pulley and the moving end of the shade. The second end of cable means (206) and (208) is attached to the moving end of the shade, usually along shade rail (76).

Turning now to first cable means (206), FIG. 1 illustrates that first cable means (206) begins at adjustable attachment means (216), continues along segment (206a) to loop around sliding pulley (204), thereby reversing direction. Segment (206b) carries first cable means (206) to fixed pulley (212) where it encounters a change in direction to descend downward as segment (206c) to fixed pulley (209) where it is routed upward as segment (206d) to tie in at (209') to shade rail (76). It can be seen then that first cable means (206) engages one sliding pulley (to effect a moving force) and two fixed pulleys (to effect a change in direction) before it ties in at (209'). Sliding lever actuator (60) to the right as illustrated in FIG. 1 can be seen to force shade rail (76) downward or towards a closed position. It can be also seen that the movement of actuator lever (60) one unit of linear travel along track (200) will move shade rail (76) two times the linear distance lever actuator (60) moves.

Also illustrated in FIG. 1 is the cooperative engagement of sliding pulley (204) with second cable means (208) which is fixed at adjustable attachment means (218). Second cable means (208) runs generally parallel to upper frame member (22) along the underside thereof as segment (208a). After looping around sliding pulley (204), segment (208b) loops around fixed pulley (214) to either transversely cross window shade (10) to fixed pulley (210) and downward to tie in (209') as shown by segments (208c) and (208d) or in the alternative, around fixed pulley (214) and vertically downward to tie into the right end of shade rail (76), opposite tie in (209') (this alternative not shown).

The first cable block and tackle means comprising a first cable means (206) and sliding pulley (204) cooperates to move shade rail (76) downward or from an open to a closed position, and a second block and tackle means incorporating the same sliding pulley (204) and second cable means (208) cooperates to move shade rail (76) upward or from a closed to an open position.

Alignment means comprises of cables (88) and (90), pulleys (226) and (228) and eyelets (92). Cables (88) and (90) tie in at adjustably fixed attachment points (95) along lower frame member (24). They ascend upward and criss-cross at pulleys (126) and (128) along the underside of shade rail (76). From there, eyelets (92) or example, rubber grommets) direct cables (88) and (90) upward to attachment points along rail (77).

Thus, the block and tackle means are further provided with maintenance alignment means to keep shade rail (76) in general relation parallel to upper frame member (22) and lower frame member (24).

Finally, it can be seen in FIG. 1 how variable tension in cable means (206), (208), (88) and (90) can be provided in adjustable attachment means (95), (216) and (218). By backing out screw (213) and sliding adjustable attachment means (95), (216) or (218), then tightening the screws along the frame rails, the practitioner can loosen or tighten the cables as necessary.

The preferred material for first and second cable means (206) and (208) respectively is: HD Cord, Product Code 5009-085, 959 Natural, manufactured by Hunter Douglas Inc., 2 Park Way & Rt. 17 South, Upper Saddle River, N.J. 07458. The pulleys are preferably comprised of a nylon based material which resists wear and resists abrasion or cutting of first and second cable means (206) and (208). Sliding pulley (204) is preferably a double-track pulley to allow first cable means (206) to track in a first track thereof and second cable means (208) in a second track thereof so there will be no physical contact between the two cable means, and avoid abrasion thereby. The preferred pulleys, Part No. BP-243-MSA, are manufactured by Quarles Manufacturing, 958 Steves, San Antonio, Tex. 78210.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described in connection with the preferred embodiment, it is not intended to limit the invention to a particular form set forth, but on the contrary, it is intended to cover such alternatives, modifications, and equivalents as may be included within the spirit and the scope of the invention as defined by the appended claims.

I claim:

1. A device for raising and lowering a shade of a modular aircraft window between an open and closed position, the window comprising an inner pane, an outer pane, frame assembly securing said inner pane and said outer pane in space, generally parallel relation, collapsible shade means with a fixed end and a movable end, the device comprising:
    actuator means operatively connected to said shade means for moving said shade between the open and the closed position, said actuator means having a throw that is less than the distance between the open and the closed position; and
    an alignment means, said alignment means to maintain the moving end of said collapsible shade means perpendicular with the direction of travel of said collapsible shade means.

2. The device as described in claim 1 wherein said actuator means comprises a block and tackle means.

3. The device as described in claim 2 wherein said block and tackle means includes a movable pulley and first cable means, the first cable means with a first end and a second end, the first end fixed to a point stationary with respect to both the movable pulley and the movable end of the collapsible shade means, the second end attached to the movable end of the collapsible shade means, the movable pulley means cooperatively engaging the first cable means such that moving the movable pulley in a first direction causes the movable end of the collapsible shade means to move in a first direction.

4. The device as described in claim 3 wherein said block and tackle means further includes second cable means, the second cable means with a first end and a second end, the first end fixed to a point stationary with respect to both the movable pulley and the movable end of the collapsible shade means, the second end attached to the movable end of the collapsible shade means, the movable pulley means cooperatively engaging the second cable means, such that moving the movable pulley in a second direction causes the movable end of the collapsible shade means to move in a second direction.

5. The device as described in claim 3 further including a means accessible from the outside of the modular aircraft window for moving the movable pulley.

6. The device as described in claim 4 further including a means accessible from the outside of the modular aircraft window for moving the movable pulley.

7. Device as described in claim 5 wherein said block and tackle means further includes a means for changing the direction of the first cable means.

8. Device as described in claim 4 wherein said block and tackle means further includes a means for changing the direction of the first and the second cable means.

9. The devise as described in claim 5 wherein the movable pulley is a double track pulley.

10. The device as described in claim 6 wherein the movable pulley is a double track type pulley.

11. A device for raising and lowering a shade of a modular aircraft window between an open and closed position, the window comprising an inner pane, an outer pane, frame assembly securing said inner pane and said outer pane in space, generally parallel relation, collapsible shade means with an end fixed to the frame assembly and a movable end, the device comprising:
    an actuator means comprising a block and tackle, said block and tackle means including a movable pulley and first cable means, the first cable means with a first end and a second end, the first end fixed to a point stationary with respect to both the movable pulley and the movable end of the collapsible shade means, the second end attached to the movable end of the collapsible shade means, the movable pulley cooperatively engaging the first cable means such that moving the movable pulley in a first direction causes the movable end of the collapsible shade means to move in a first direction; said actuator means including second cable means with a first end and a second end, the first end fixed to a point stationary with respect to both the movable pulley and the movable end of the collapsible shade means, the second end attached to the movable end of the collapsible shade means, the movable pulley cooperatively engaging the second cable means, such that moving the movable pulley in a second direction causes the movable end of the collapsible shade means to move in a second direction;

a means accessible from the outside of the modular aircraft window for moving the movable pulley;

a means for changing the direction of the first and second cable means, the direction changing means cooperatively engaged with the first and second cable means;

wherein said actuator means has a throw that is less than the distance between the open and closed position of the window shade.

* * * * *

UNITED STATES PATENT AND TRADEMARK OFFICE
CERTIFICATE OF CORRECTION

PATENT NO. : 5,082,043
DATED : January 21, 1992
INVENTOR(S) : MORENO, Gilbert C.

It is certified that error appears in the above-indentified patent and that said Letters Patent is hereby corrected as shown below:

In FIG. 1, above element 212 (fixed pulley), element 216 (adjustable attachment means) and its lead line should be added. --.

In FIG. 1, element "209" (on the left end of shade rail 76) should read -- 209' --.

Signed and Sealed this

Twenty-sixth Day of December, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,082,043
DATED : January 21, 1992
INVENTOR(S) : MORENO, Gilbert C.

It is certified that error appears in the above-indentified patent and that said Letters Patent is hereby corrected as shown below:

On the title page, item [63]

Continuation-in-part of Ser. No. 415,016, filed Sep. 29, 1989, now Pat. No. 4,998,576, issued Mar. 12, 1991, and a continuation-in-part of Ser. No. 667,019, filed Mar. 8, 1991, abandoned.

Signed and Sealed this

Fifteenth Day of October, 1996

Attest:

BRUCE LEHMAN

*Attesting Officer*      *Commissioner of Patents and Trademarks*